United States Patent [19]

Drath

[11] Patent Number: 5,414,880
[45] Date of Patent: May 16, 1995

[54] OIL DRAIN STRUCTURE

[76] Inventor: Scott R. Drath, N43 W26055 Lindsay Rd., Pewaukee, Wis. 53072

[21] Appl. No.: 151,851

[22] Filed: Nov. 15, 1993

[51] Int. Cl.$^6$ .............................................. E03C 1/01
[52] U.S. Cl. .................................................. 4/641; 4/637
[58] Field of Search ................ 4/619, 637, 629, 641, 4/640

[56] References Cited

U.S. PATENT DOCUMENTS

| 682,482 | 9/1901 | Minns | 4/641 |
|---|---|---|---|
| 964,857 | 7/1910 | Fredenhagen | 4/641 X |
| 1,102,411 | 7/1914 | James | 4/641 X |
| 1,842,289 | 1/1932 | Russel | 4/641 |
| 2,157,785 | 5/1939 | Coordes | 4/637 |
| 3,235,886 | 2/1966 | Scharmer | 4/637 |
| 4,403,692 | 9/1983 | Pollacco | 206/223 |
| 4,533,042 | 8/1985 | Pollacco | 206/223 |
| 4,702,290 | 10/1987 | Perez | 141/332 |
| 4,813,087 | 3/1989 | Sperka et al. | 4/629 |
| 4,880,144 | 11/1989 | Shea | 222/173 |
| 4,880,156 | 11/1989 | Wallet | 232/43.1 |
| 4,935,991 | 6/1990 | Tourney | 4/629 X |
| 5,067,530 | 11/1991 | Short, III | 141/98 |
| 5,073,997 | 12/1992 | Rabe | 4/629 |
| 5,168,959 | 12/1992 | Davis | 184/1.5 |

Primary Examiner—Charles E. Phillips
Attorney, Agent, or Firm—Willis B. Swartwout, III

[57] ABSTRACT

The present invention relates to oil collecting structure and more particularly to a cabinet or structure for the home garage into which drain oil and fresh oil dregs may be dumped and in which it may be collected for proper ecologically sound disposal. The structure consists of a cabinet divided into a sink portion and a drainboard portion. The drainboard portion is immediately adjacent the sink portion and portions of all or some of the structure are covered by sheet metal covers or inserts. The sink and its insert are shaped to slope downwardly from the outer margins or edges towards the center where a drain aperture is provided. The sink insert drain aperture fits telescopingly within the sink portion aperture and may be adapted so that containers for the oil may be connected to it. The shaping of the sink potion and sink create troughs from the exterior margins and corners to the center drain aperture. The drainboard and its cover are elongated and sloped from the margin thereof remote from said sink and sink portion toward said sink and sink portion and also from the side margins toward the center making troughs from the remote corners to the center of the drainboard adjacent the sink. The cabinet structure may have one or more shelves and a bottom as well as one or more doors for storage.

5 Claims, 3 Drawing Sheets

OIL DRAIN STRUCTURE

BACKGROUND OF THE INVENTION

The present invention relates to oil drain structure and more particularly to improved oil drain structure for use by do-it-yourself home automobile servicers although the structure of the invention could be used in a commercial garage.

In the past there have been problems of the usual sort in attempting to change oil in a home garage not the least of which involved structure that would easily and conveniently fit underneath the automobile in the drain pan area when there is no lift for the automobile. Even where there is some type of lift available problems existed and often resulted in spillage of the used oil on the garage floor.

In addition to the problem of cleaning up the spilled used oil was the problem of removal of the stain from porous garage floors such as unsealed concrete and the like. On blacktop the oil often dissolved the surface coating leaving holes in the surface.

Subsequently came the problems associated with the matter of disposing of the used oil in an environmentally sound manner. It was no longer legally acceptable for used or so called drain oil to simply be scattered on the ground and absorbed into the soil so means had to be devised not only to collect the drain oil without spilling it but to collect it in such a fashion that it could be easily stored in containers for appropriate disposition. With the often limited amount of space beneath a vehicle in a home garage which has no substantial lifting apparatus for the vehicle the commercial types of collecting apparatus was not usable in addition to being too costly for the ordinary home servicer.

SUMMARY OF THE INVENTION

The present invention proposes to overcome the problems of the prior art and environmentally sound collection and disposition of the drain oil and dregs of fresh oil in oil containers after being predominantly emptied into an engine by providing a drain cabinet for placement in a home garage which provides a place to collect that oil as well as to store equipment used in the oil changing process.

It is an object to of the present invention to provide a structure of the type above described which includes a drain board and/or sink.

It is another object of the present invention to provide structure of the character above described wherein the drainboard area is tilted from level towards the sink location.

It is yet another object of the present invention to provide structure of the character above described wherein the sink is provided with a centrally disposed drain.

It is still another object of the present invention to provide in structure of the character above described a sink having a centrally disposed drain and a plurality of radially disposed troughs leading from the margins of the sink to the drain.

It is yet a further object of the present invention to provide structure of the character above described further provided with a storage cabinet for storage of oil draining and collecting equipment and related items.

It is still a further object of the present invention to provide an aperture in said structure beneath the sink and more especially the sink drain wherein collecting containers may be placed and secured to the drain from below to collect drain oil or dregs from within the sink.

The foregoing and other objects and advantages of the present invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
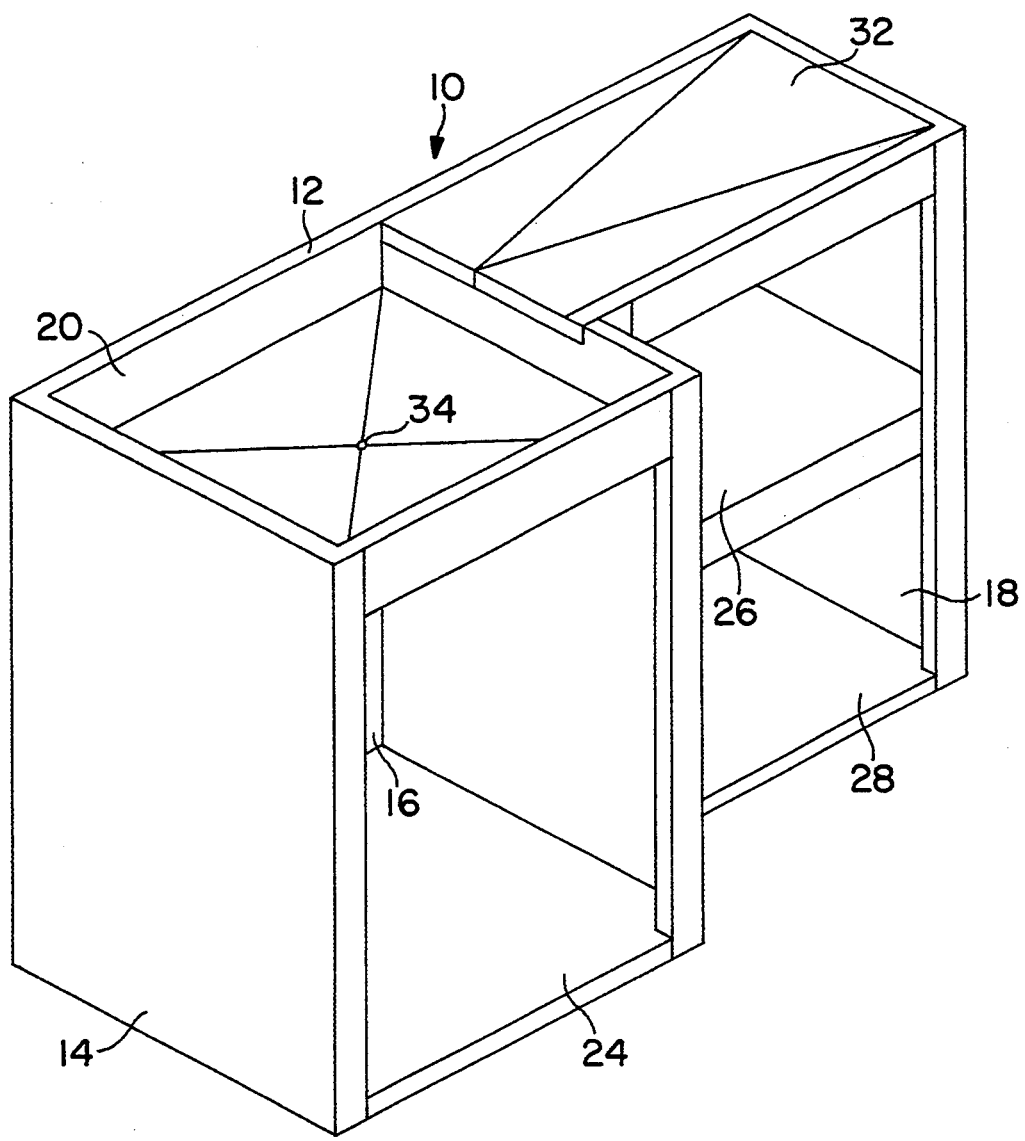
FIG. 1 is a perspective view of structure embodying the present invention.

Referring now to the drawings and particularly to FIG. 1 thereof, a oil drain structure or cabinet is shown and generally identified by the numeral 10. Referring in addition to FIGS. 2 and 3A, 3B and 3C it will be seen that structure or cabinet 10 has a top 12, a left side 14 a back 16 and a right side 18.

Figure 2:
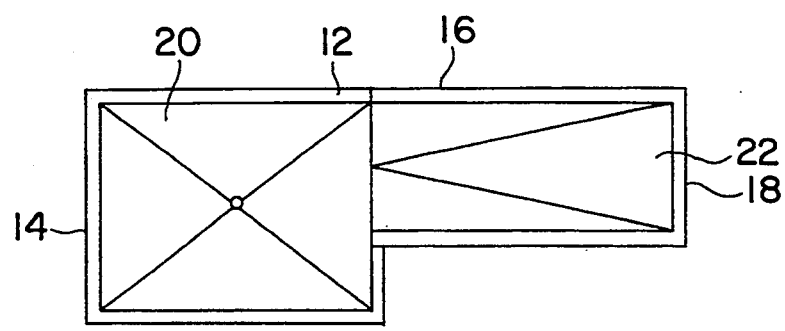
FIG. 2 is a top plan view of the structure shown in FIG. 1.
Figure 4:
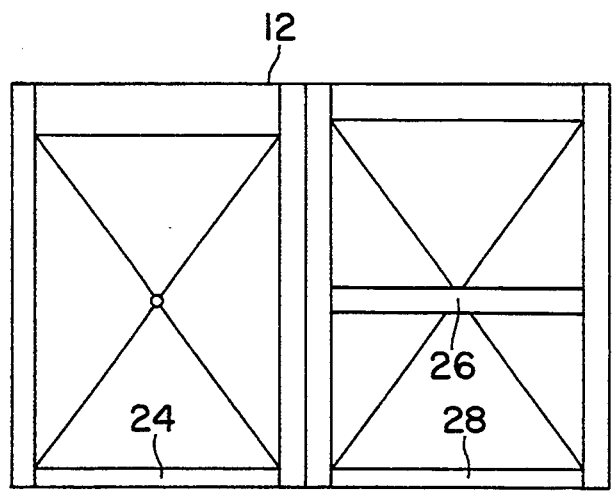
FIG. 4 is a view from the front of FIG. 1, with the doors removed.
Figure 3A:
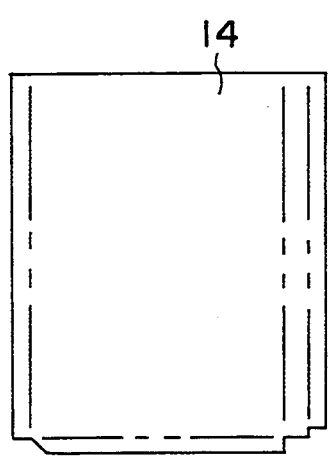
FIG. 3A, 3B, and 3C are views depicting the left, back and right sides of the structure shown in FIG. 1.
Figure 3B:
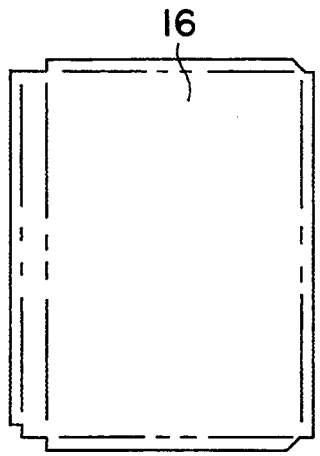
Figure 3C:
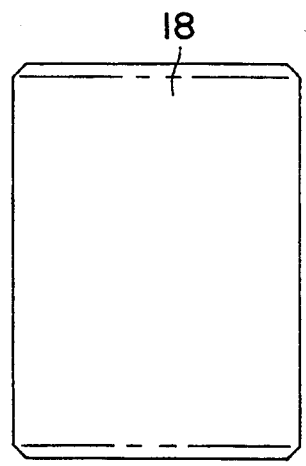
Figure 5A:
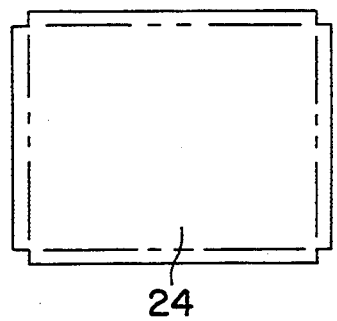
FIG. 5A, 5B and 5C are views of the bottom, door and mullion respectively of the present invention.

Specifically referring to FIGS. 1 and 2 it should be noted that top 12 has a sink portion 20 having a centrally disposed aperture 34 and a drain board portion 22. Referring to FIG. 5A it will be clear that structure or cabinet 10 includes a bottom 24. While this invention primarily contemplates a free standing structure or cabinet 10 it should also be apparent that the back 16 and bottom 24 could be left off and the cabinet or structure 10 "built in" to the garage.

Figure 6:
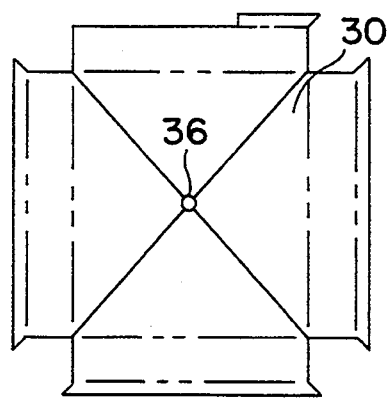
FIG. 6 is a view of the metal sink insert.

Referring back to FIG. 1, it will be noted that a shelf 26 is disposed within structure or cabinet 10 under drain board portion 22 intermediate top 12 and drain board portion bottom 28. Referring most specifically now to FIGS. 1, 2 and 6 of the drawings it will be noted that a sheet metal sink insert 30 and drain board covering 32 are shown, said sink insert 30 having a centrally disposed aperture 36 adapted to fit concentrically, telescopingly (not shown) within drain aperture 34. It should be noted at this time that sink portion 20 is shaped to tilt angularly downward from all edges and corners toward the bottom center where a drain aperture 34 is provided. Also it should be noted in referring to FIG. 2, that drain board portion 22 is tilted from its edge remote from the sink portion 20 toward sink portion 20 and from its front and rear edges toward the center forming a V-shaped drainboard center having its lowermost apex point intermediate the front and rear edges thereof at the sink insert margin such that any oil or container deposited in the drain portion with its opening down or toward the sink portion will drain by virtue of gravity into the sink portion 20. The sheet metal sink insert 30 is shaped to conform to the description of the sink portion 20 and is provided with a centrally disposed drain aperture 36 adapted to fit concentrically and telescopingly within the centrally disposed aperture in sink portion 20 and even extend therethrough a short distance if desired. Similarly the drain board portion 22 is provided with sheet metal covering 32 shaped to conform to drain board portion 22. Both sheet metal insert 30 and cover 32 are made from light weight sheet aluminum but could be made from any desirable metal depending on the use.

Figure 5B:
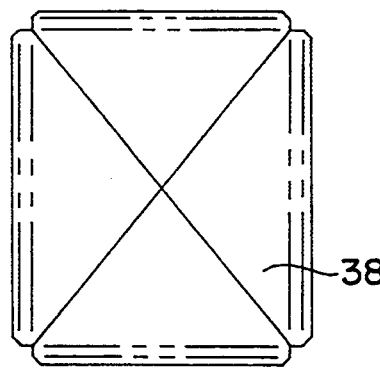
Figure 5C:
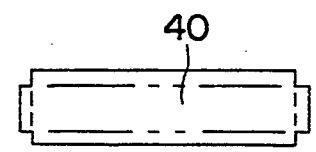

Any suitable container (not shown) may be placed under the drain aperture 36 to receive the used oil or dregs for appropriate, ecologically desirable disposition. The container may be open across the top or provided with a neck and receiving aperture which may be secured if desired to the sink insert aperture 36. Likewise one or more additional shelves (not shown) may be placed in the cabinet section below the sink portion 20 if desirable. One or more doors 38 as shown in FIG. 5B may be used to close structure or cabinet 10. Any suitable mullion 40 as shown in FIG. 5C may be used to separate the compartments of structure 10. Also note that any or all items of this structure in addition to the sink portion 20 and the drain board portion 22 may be sheet metal covered, if desired.

The foregoing description has been for the purposes of illustration. Various modifications and changes may be made without departing from the spirit and scope of the present invention. For example, sink and drainboard structure 10 may be oriented with the drain board portion 22 either to the right, left or rear of sink portion 20 without departing from the spirit of the present invention. Therefore, the invention should not be limited by the specific embodiment described, but only by the claims appended hereto.

I claim:

1. A device for the collection and disposition of drain oil and fresh oil dregs comprising:
    a) a drain cabinet structure for placement in a home garage including a sink portion and a drainboard portion adjacent said sink portion;
    b) a sink insert disposed within said sink portion and a drainboard insert disposed over said drainboard portion adjacent to said sink;
    said drainboard insert and said drainboard portion being elongated and sloped downwardly from a boundary remote from said sink portion and said sink insert and from side margins of said drainboard insert and said drainboard portion, progressively toward a longitudinal centerline of said drain board and said drainboard insert,
    whereby said drainboard portion and said drainboard insert form a V-shaped central panel having its apex lowermost and positioned at a point adjacent a periphery of said sink portion and said sink insert such that oil will drain from said insert toward said apex and subsequently into said sink insert.

2. The structure as set forth in claim 1, wherein the structure includes shelves and a bottom for storage.

3. The structure as set forth in claim 1, wherein the sink portion and the sink are shaped to tilt downwardly from the margins toward the center.

4. The structure as set forth in claim 1, wherein the sink portion and sink are shaped to slope downwardly from their margins forming a plurality of troughs extending from the margins of said sink and sink portion radially toward the centers thereof.

5. The structure as set forth in claim 1, wherein said sink portion and said sink are provided with centrally disposed drain apertures and wherein said sink aperture telescopingly within said sink portion aperture.

* * * * *